US006640855B2

(12) United States Patent
Giles

(10) Patent No.: US 6,640,855 B2
(45) Date of Patent: Nov. 4, 2003

(54) LOG HOME FABRICATION PROCESS AND ASSOCIATE LOG CUTTING MACHINE

(75) Inventor: Randy K. Giles, Dandridge, TN (US)

(73) Assignee: Hearthstone, Inc., Dandridge, TN (US)

( * ) Notice: Subject to any disclaimer, the term of this patent is extended or adjusted under 35 U.S.C. 154(b) by 0 days.

(21) Appl. No.: 09/946,179

(22) Filed: Sep. 5, 2001

(65) Prior Publication Data

US 2003/0041919 A1 Mar. 6, 2003

(51) Int. Cl.[7] ........................... B23Q 15/00; B27B 5/00; B26D 7/06

(52) U.S. Cl. ........................ 144/357; 29/26 A; 144/2.1; 144/3.1; 144/35.1; 144/242.1; 144/245.1; 144/250.23; 144/246.1; 144/365; 144/367; 144/382; 83/442; 83/253.1; 83/253.6; 83/415; 83/435.11

(58) Field of Search ............................ 144/1.1, 3.1, 39, 144/242.1, 245.1, 250.23, 253.1, 253.6, 246.1, 357, 367, 382, 371, 373, 92, 93.1, 2.1; 83/442, 412, 415, 435.11, 367, 368, 436.3; 29/26 A; 269/55, 56, 58, 35.1; 408/22, 24, 30

(56) References Cited

U.S. PATENT DOCUMENTS 4,277,925 A 7/1981 Kinser
4,392,520 A * 7/1983 Wrightman ................. 144/3.1
4,840,003 A 6/1989 Lucas et al.
4,903,743 A * 2/1990 Zweig ........................ 144/3.1
4,918,888 A 4/1990 Giles et al.
4,938,263 A * 7/1990 Wrightman ................. 144/3.1
5,505,028 A 4/1996 Giles
6,196,283 B1 * 3/2001 Hundegger ................. 144/3.1

* cited by examiner

*Primary Examiner*—W. Donald Bray
(74) *Attorney, Agent, or Firm*—Pitts & Brittian, PC

(57) ABSTRACT

A log processing machine and associate method employs one or more log guides to make joinery cuts in a processed log which has at opposed edges of the processed log the raw log's natural external contour. In a preferred embodiment of the invention, each log guide includes a straight edge and is attached to the processed log to create an artificial straight edge for guiding the processed log through the joinery machine. Prior to attachment, centerlines are marked on the log guide and the processed log, and the centerlines are aligned when the log guide is attached to the processed log. The processed log, with the log guide attached, is then moved through the machine with the aid of computer control while the straight edge of the log guide follows a fence. In this manner, the position of the processed log and its centerline are always known so that the computer can make the programmed joinery cuts with high precision. An alternate embodiment of the invention employs one or more fence extensions as log guides. The fence extensions are positionable in guide channels formed in the contoured edges of the processed log. A further embodiment of the invention employs an opposed pair of clamping/alignment elements which are controlled by a computer to align and guide the log through the joinery machine.

29 Claims, 5 Drawing Sheets

*Fig.* 1

LOG HOME FABRICATION PROCESS AND ASSOCIATE LOG CUTTING MACHINE

BACKGROUND

1. Field of the Invention

The present invention relates generally to log structures and methods of constructing log structures. More particularly, the present invention relates to a log cutting machine and associate process of cutting logs for use in log structure construction.

2. Background of the Invention

In the process of manufacturing log structures, raw logs from felled timber are typically hand selected and sent to the sawmill for processing. At the sawmill, two parallel cuts are made of the raw log to produce a log that is sawn flat on two parallel sides and then left with the natural contour of the original tree (less bark) on the two remaining surfaces. If desired, two further parallel cuts can be made of the log to remove the opposed natural contoured edges, producing a rectangular cant which will form a portion of the log structure. For log structures which specify a more natural looking log, the natural contoured edges are left on the log (or "half finished" cant).

Before the log can be joined with other logs to form the structure, the log must be further processed. If the log is to be used in the construction of walls, each end of the log is cut with some sort of intersecting notch (i.e., a dovetail). If the log is to be used as a rafter or beam, a bird's mouth cut may be required. Rectangular logs are typically processed at this point with a large cutting machine, commonly referred to as a joinery machine, which makes the necessary joinery cuts. The straight edges of the rectangular log enable the joinery machine to make the necessary cuts with precision. The same process may be employed by use of simpler machinery operated manually. But, in all cases, the straight edges of the log cant greatly simplify the manufacturing process. Logs which still have the natural external contour of the raw timber log in place on opposed edges of the log cannot be so easily processed because the width of the log will vary along its length. Thus, the joinery cuts must be carefully measured and made by hand, often with chain saws. As compared to the joinery machine or other method of processing a rectangular timber cant, the process of making joinery cuts by hand on an irregularly shaped timber log is labor intensive, expensive, and much more prone to error.

Therefore, there is a need for an improved machine and method of processing logs for use in the construction of log structures.

SUMMARY OF THE INVENTION

The present invention eliminates the difficulties and disadvantages of the prior art by providing an apparatus for processing a log to be incorporated into a log structure. The log includes two substantially parallel surfaces, two opposed edges which maintain the natural contour of the raw timber log, and a log centerline. The apparatus includes a support for supporting the log substantially horizontally on one of its substantially parallel surfaces. A cutter is provided for cutting the log. A mover moves the log substantially horizontally along the support to the cutter. A guide aligns the log centerline with respect to the cutter, and a controller is employed for controlling operation of the mover and the cutter.

In accordance with one aspect of the invention, the guide is in the form of a log guide which is attached directly to the log. The log guide includes a guide edge which maintains contact with the fence as the log is moved to the cutter. The log guide also includes a centerline which is aligned with the log centerline when being attached to the log. If desired, two or more of the log guides may be attached to the log.

In accordance with another aspect, the guide is in the form of a fence guide attached to the fence. The fence guide includes a guide edge which maintains contact with the bottom of a guide channel formed in the log at a uniform distance from the log centerline as the log is moved to the cutter. If desired, two or more of the fence guides may be attached to the fence.

In accordance with a further aspect of the invention, the guide includes two opposed alignment elements forming a portion of the mover. The alignment elements are positionable adjacent the opposed, naturally contoured edges of the log and are movable by the controller to clamp the log in compression and to align the log centerline with respect to the cutter.

The present invention also provides an apparatus for processing a log to be incorporated into a log structure where the log includes two substantially parallel surfaces and a log centerline normal to the substantially parallel surfaces. The apparatus includes a support for supporting the log substantially horizontally on one of its substantially parallel surfaces. A fence is positioned adjacent the support. A cutter, such as a saw blade or universal mill, is provided for cutting the log. A mover is used to move the log substantially horizontally along the support to the cutter. A controller, which may be networked to computer aided design workstations, controls operation of the mover and the cutter. The apparatus also includes at least one guide, which is not a portion of the log itself, in contact with the fence. The effect of the guide is to maintain the log centerline substantially parallel to the fence at a fixed distance from the fence as the log is moved to the cutter.

The present invention also provides a method for processing a log to be incorporated into a log structure where the log includes two substantially parallel surfaces and a log centerline normal to the substantially parallel surfaces. In accordance with the method, the log is supported substantially horizontally on a first one of its substantially parallel surfaces. A log guide, having a guide edge, is attached to the log. The guide edge is positioned in contact with a fence. The log is then moved substantially horizontally to a cutter for processing of the log as the guide edge is held in contact with the fence.

To ensure proper attachment of the log guide to the log, the centerlines of the log guide and the log are marked. The marked centerlines are then aligned with one another when the log guide is attached to the log.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
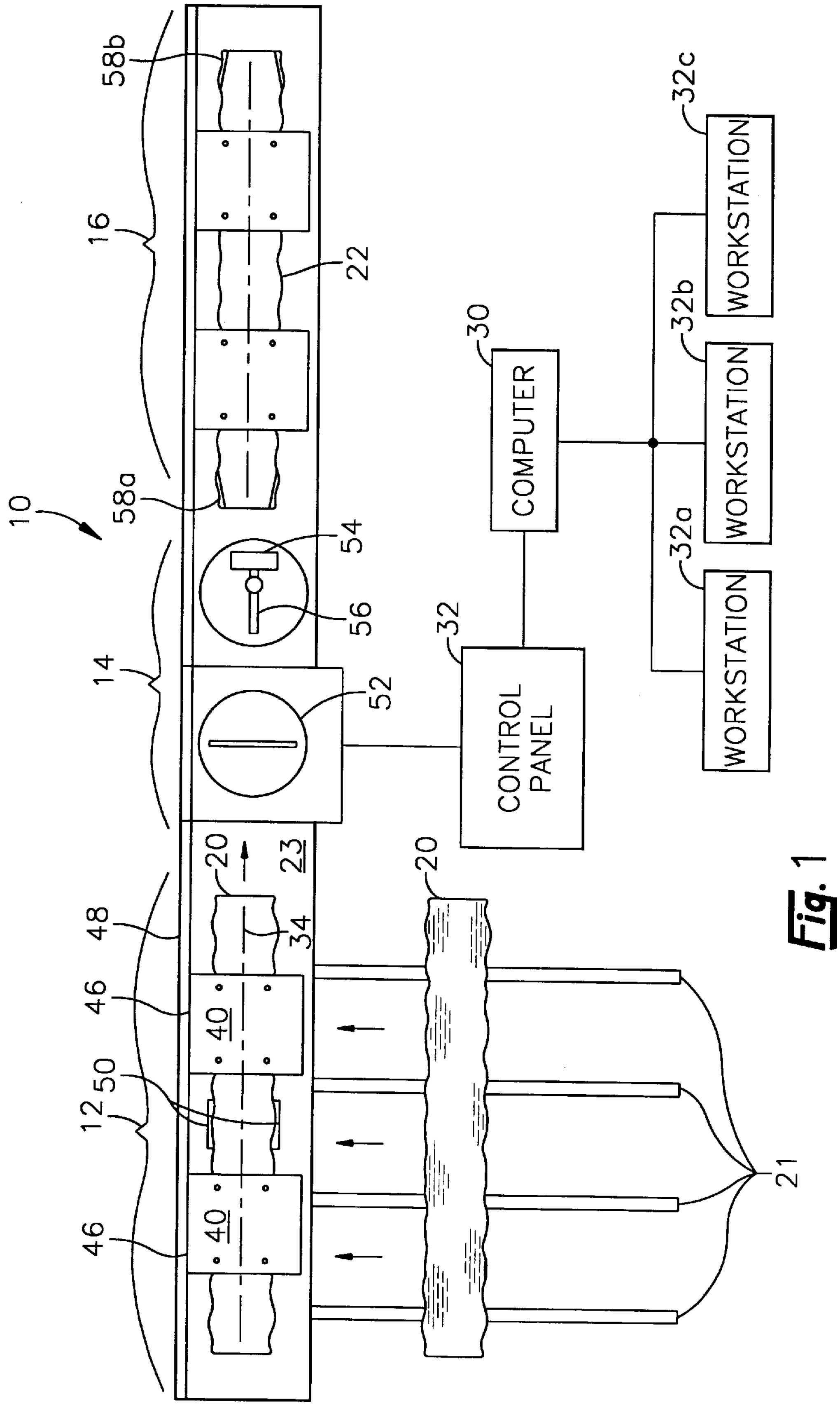
FIG. 1 is an overhead view of a log processing machine according to the invention.

With reference now to the drawings in which like reference characters designate like or similar parts throughout the several views, FIG. 1 provides an overhead view of a log processing machine 10 according to the invention. The machine 10 is a specially designed joinery machine which processes logs 20 that will be incorporated into a log structure. A similar joinery machine capable of processing rectangular logs is available from Hundegger USA of Charleston, Utah under the product name K2. The machine 10 is capable of making a variety of high precision joinery cuts to the logs 20, including lap joints, dovetails, bird's mouth, and others.

Generally, the machine 10 includes an input section 12 where logs 20 are received, a processing section 14 where logs 20 are processed with the use of one or more cutting devices, and an output section 16 where processed logs 22 are removed from the machine 10. In a preferred embodiment, the machine 10 includes a computer 30 programmed to perform the necessary cutting operations on the logs 20. One or more computer aided design workstations 32*a–c* are preferably networked to the computer 30 to enable automated transfer of design information, including information relating to the type(s) of cut needed for a particular log 20, the dimensions of the cut, and where along the log 20 the cut should be made. A control panel 32 provides a user interface for controlling operation of the machine 10.

Figure 2:
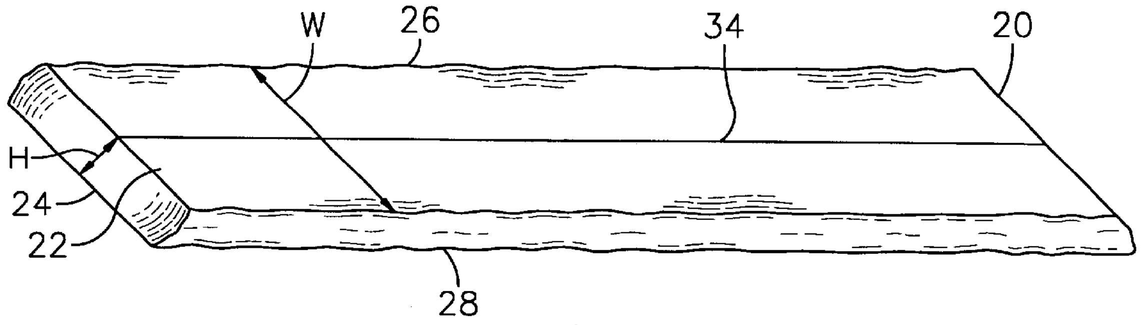
FIG. 2 is an elevated view of a log for which the machine of FIG. 1 is configured to process.

FIG. 2 shows a log 20 for which the machine 10 is particularly suited for processing. Prior to being processed by the machine 10, the log 20 is formed from a raw timber log by making two lateral, substantially parallel cuts along the middle of the raw timber log which define the log's height H. The lateral cuts produce a log 20 having opposed planar surfaces 22, 24 which are substantially parallel to one another. The raw timber log's natural external contour is retained at the planar surfaces' outer edges 26, 28 to provide a more natural looking log 20 in the finished log structure. The log 20 of FIG. 2 is the middle portion of the raw timber log. Typical dimensions of the log are between about 12–22 inches in width W and between about 6–8 inches in height H. The overall length of the log 20 can vary significantly from a few inches to more than 40 feet.

Referring again to FIG. 1, at the input section 12 logs 20 are placed on rails 21 and prepared for processing by the machine 10. Prior to the invention described herein, joinery cuts to logs 20 of the type shown in FIG. 2 had to be made by hand. This is because the log 20 does not have a straight edge that can be used by a joinery machine to determine where the log's center 34 lies. Since the log's natural contoured edges 26, 28 vary in distance from the log's centerline 34, the joinery machine cannot reliably determine the center 34 of the log, and hence, cannot accurately place the joinery cuts. Thus, joinery machines of the prior art are limited to processing rectangular logs (also referred to in the art as the "cant") which have had the outer contoured edges 26, 28 removed.

Figure 3:
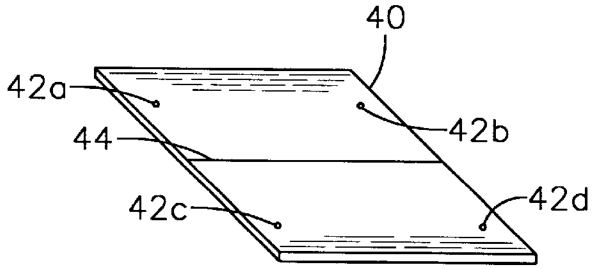
FIG. 3 is an elevated view of a template for being attached to the log of FIG. 2 according to the invention.
Figure 4:
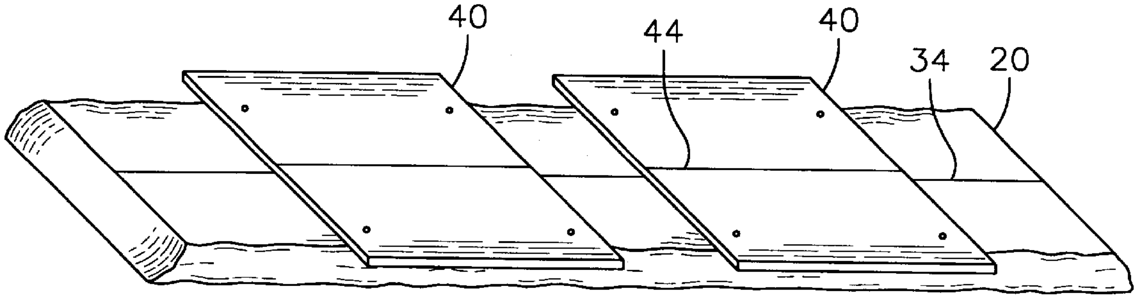
FIG. 4 is an elevated view of a log cant with templates attached the log according to the invention.

In accordance with one preferred embodiment of the present invention, an artificial straight edge is added to the log 20 shown in FIG. 2 to enable the machine 10 to accurately determine where the center 34 of the log 20 is, and to maintain an alignment of the log centerline 34 with one or more the machine's cutter(s) at all times. In one preferred embodiment, this is accomplished with the use of one or more log guides 40 (FIG. 3) attached to the log 20 as shown in FIG. 4. Preferably, the log guide 40 is a two square foot sheet of one-inch thick plywood. The center of the log guide 40 is marked with a centerline 44. As shown in FIG. 2, the center of the log 20 is also marked with a centerline 34 using, for example, a pencil to strike a line or laser light to illuminate a line. The log guide centerline 44 is then aligned with the log centerline 34, and the log guide 40 is attached to the log 20 as shown in FIG. 4. While a single log guide 40 will suffice, two log guides 40 are employed in the preferred embodiment of FIG. 4.

The log guide 40 can be attached to the log 20 using any effective manner of attachment. In a preferred embodiment, four holes 42*a–d* are pre-drilled in the log guide as shown. Wood/lag screws are inserted through the holes 42*a–d* and used to screw the log guide 40 to the log 20. Washers are preferably positioned between the screw head and the top of the log guide 40 to prevent the screw head from burrowing into the log guide 40 during attachment. In another preferred embodiment, the log guide 40 is attached to the log 20 by means of vacuum attachment.

Referring again to FIG. 1, with the log guides 40 attached to the log 20, the log 20 is moved along the rails 21 and onto a horizontal support surface 23 at the input section 12 of the machine 10. The log 20 is positioned so that one edge 46 of each log guide 40 is in contact with a guide fence 48. A mover, shown generally at 50, grasps the log 20 and moves it toward the processing section 14 in accordance with commands sent from the computer 30 to the mover 50. The mover 50 maintains contact between the log guide edges 46 and the fence 48 as the log is moved substantially horizontally to the processing section 14. Thus, the log centerline 34 is maintained at a fixed and known distance from the fence 48 (and in a known alignment with the machine's cutters) as the log is moved to and through the processing section 14.

Although the guide fence 48 of FIG. 1 is a continuous, statice fence, it will be appreciated that the guide fence 48 can take many forms in accordance with the invention. For example, the mover 50 may be configured to also function as a moving guide fence 48 for the log 20. This may be accomplished by allowing one of the mover's clamping elements (the one adjacent the guide fence 48 of FIG. 1) to move only in the direction along the long axis of the machine 10 (which may generally be regarded as substantially parallel with the log centerline 34 as shown in FIG. 1). The other clamping element of the mover 50 would be mechanized to move back and forth along the machine axis and to also move in and out in a direction normal to the machine axis. In this configuration, when a log guide 40 is grasped by the mover 50, the log guide 40 will be held against the "moving fence" side of the mover 50 with the log 20 being in correct alignment for processing by the machine 10.

At the processing section 14, a variety of cutters are available for cutting the log 20, including a rotatable circular saw 52, a universal mill 54, and a high speed drill bit 56. Precision joinery cuts are made to the log 20 by computer control of the cutters 52–56 (which can be rotated and tilted to almost any conceivable angle) and the mover 50. Some cuts can be made with the log 20 stationary, while other cuts are made with the log 20 moving. Certain cuts even require that the log 20 and cutter both be moving at the same time. Such precision cuts are possible because the log guides 40 maintain the log's centerline 34 at a fixed and known distance from the fence 48. For example, for a log guide 40 having a two square foot dimension, it is known that the log centerline 34 is always one foot away from and parallel to the fence 48.

Figure 5:
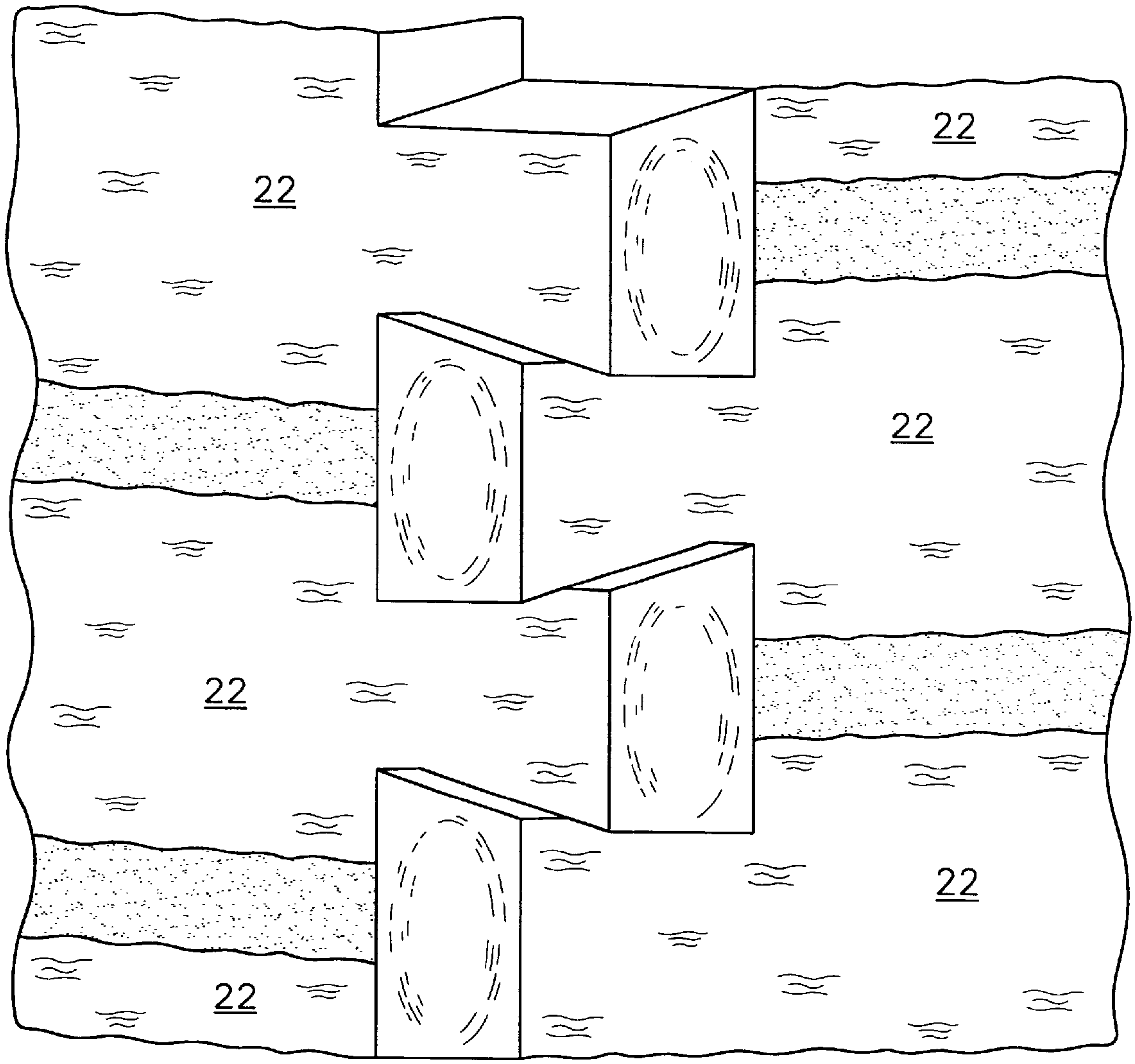
FIG. 5 depicts corner construction of a log home fabricated with logs processed in accordance with the invention.

In FIG. 1, the log 20 is processed by cutting the desired notch or notches 58*a*, 58*b* at each end of the log 20. This may be accomplished, for example, by using the universal mill 54 to cut dovetail notches. After processing, the dovetailed log 22 is moved to the output section 16. As will be understood by those skilled in the art, dovetail notches are commonly used to interlock intersecting logs at the corners of a log structure. FIG. 5 shows a typical method of corner construction by use of dovetail notches. At the output section 16, the log guides 40 are removed and the processed log 22 is ready for transport to the construction site.

It will be appreciated that numerous advantages are gained with the machine 10 and log processing method described above. For example, the machine 10 significantly reduces the amount of time and cost required to make joinery cuts to logs 20 having opposed edges that still retain the raw timber log's natural external contour. Design information can be fed directly from the designer at the CAD workstation 32*a–c* to the computer 30, and the joinery cuts made with much greater precision than could otherwise typically be made by hand. Otherwise usable logs are sometimes scrapped because of incorrect joinery cuts made by hand. Thus, the present invention reduces the amount of scrap as a result of improved accuracy.

Figure 6:
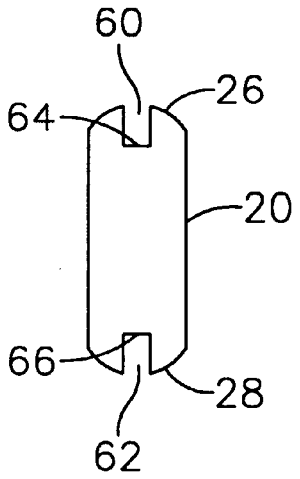
FIG. 6 is an end view of a log processed in accordance with an alternate embodiment of the invention.
Figure 7:
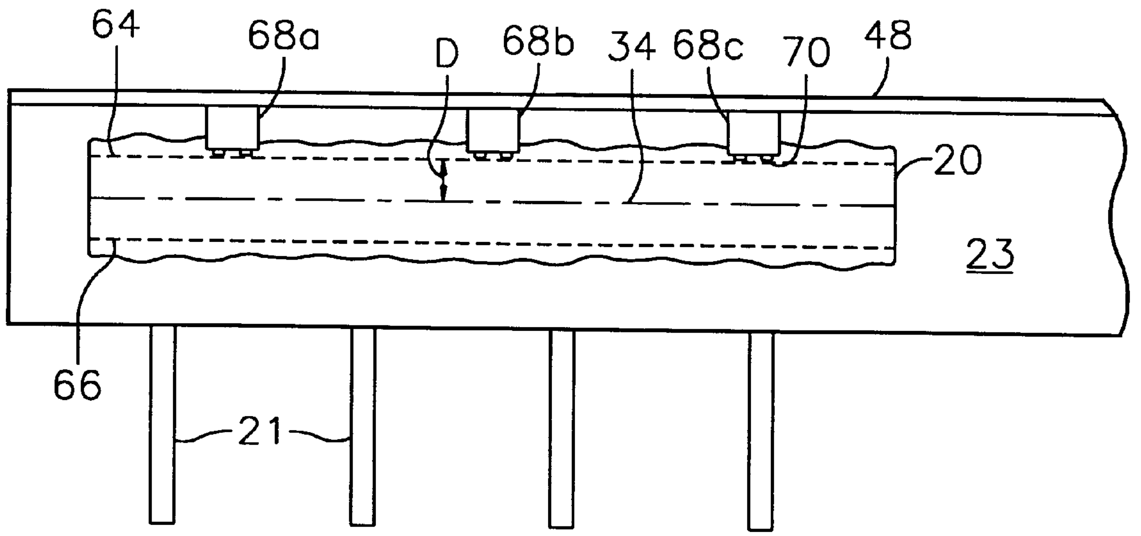
FIG. 7 is an overhead sectional view of a machine for processing the log of FIG. 6.

In an alternate embodiment of the invention shown in FIGS. 6 and 7, the log 20 of FIG. 2 is notched along each of the contoured edges 26, 28 to produce guide channels 60, 62. Each of the guide channels 60, 62 includes a bottom 64, 66 which is a uniform distance D from and substantially parallel to the log centerline 34. At the input section 12 of the machine 10, a log guide in the form of one or more fence extensions 68*a–c* are attached to the fence 48. The fence extensions 68*a–c* extend a uniform distance out from the fence 48 to engage a guide channel bottom 64. As the log 20 is moved horizontally along support 23 to a cutter in the processing section 14, the fence extensions 68*a–c* maintain the log centerline 34 at a fixed and known distance from the fence 48. For example, if each of the fence extensions 68*a–c* extend a distance of six inches from the fence and the distance D from the guide channel bottom 64 to the centerline 34 is also six inches, then the log centerline 34 is maintained by the fence extensions 68*a–c* a distance of one foot from the fence 48. As shown in FIG. 7, one or more rollers 70 may be attached to the fence extensions 68*a–c* to reduce resistance between the guide channel bottom 64 and fence extensions 68*a–c*. Also, the fence extensions 68*a–c* are preferably adjustable to accommodate logs of various heights H.

Figure 8:
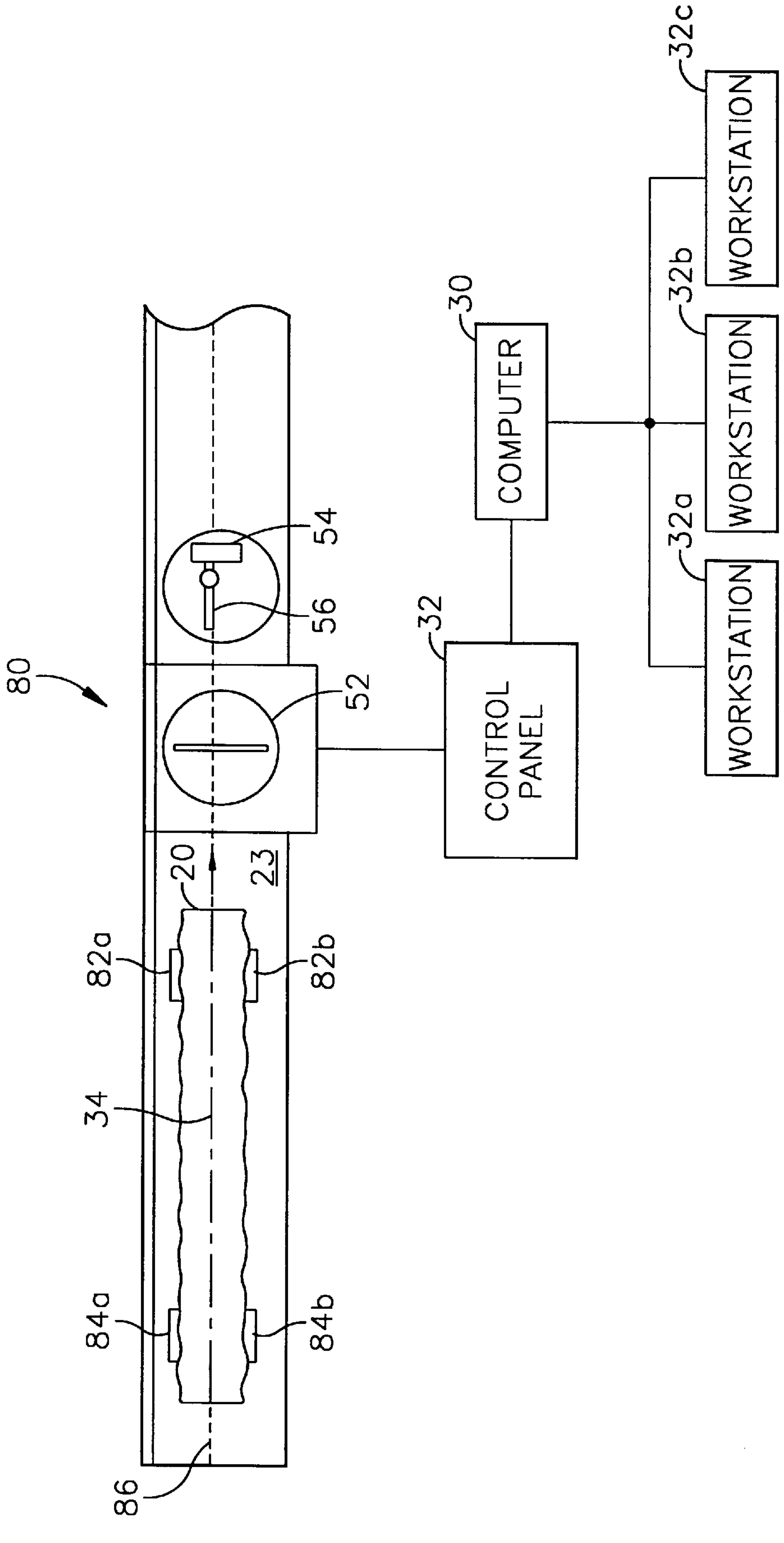
FIG. 8 is an overhead view of a log processing machine according to the invention.

Another alternate embodiment of the invention is shown in FIG. 8. This embodiment of the invention provides a more automated machine 80 for aligning the log 20 by providing two clamp-type movers (having clamping/alignment elements 82*a*, 82*b* and 84*a*, 84*b*) which automatically center the log 20 when the log 20 is being grasped by the movers. Although a single mover can be employed in accordance with the invention, two movers are used in the embodiment of FIG. 8.

To obtain and maintain proper alignment of the log 20 with the machine 80 of FIG. 8, the clamping/alignment elements 82*a*, 82*b* and 84*a*, 84*b* for each of the movers are positioned substantially symmetrically about an alignment axis of the machine 80, such as axis 86. With the log 20 positioned on horizontal surface 23 between the mover clamping elements 82*a*, 82*b* and 84*a*, 84*b*, the computer 30 is programmed to move the clamping elements 82*a*, 82*b* and 84*a*, 84*b* of each mover together at the same rate of travel so that the clamping elements 82*a*, 82*b* and 84*a*, 84*b* close in on the machine's alignment axis 86 at the same rate. The clamping elements 82*a*, 82*b* and 84*a*, 84*b* move together until the log 20 is firmly held between the clamping elements 82*a*, 82*b* and 84*a*, 84*b*. In a preferred embodiment, sensors are employed to sense compressive forces acting on the clamping elements 82*a*, 82*b* and 84*a*, 84*b*. The sensor outputs are provided as feedback to the computer 30, which stops the clamping elements 82*a*, 82*b* and 84*a*, 84*b* once the log 20 is clamped and a predetermined pressure threshold is reached. After the log 20 is clamped in this manner, the log centerline 34 will be substantially centered between the movers 82*a*, 82*b* and 84*a*, 84*b* and in substantial parallel alignment with the machine's alignment axis 86. The log's alignment is maintained as the movers 82*a*, 82*b* and 84*a*, 84*b* move the log 20 for processing by one or more of the machine's cutters 52–56.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An apparatus for processing a log to be incorporated into a log structure, said log having two substantially parallel surfaces, two opposed edges maintaining a natural contour of a raw timber log, and a log centerline defined in a plane normal to the substantially parallel surfaces, the apparatus comprising:

a support for supporting the log substantially horizontally on one of its substantially parallel surfaces;

a cutter for cutting the log;

a mover for moving the log substantially horizontally along the support to said cutter;

a guide for aligning the log centerline with respect to said cutter; and a controller for controlling operation of the mover and the cutter.

2. The apparatus of claim 1, further comprising:

a fence positioned adjacent the support; and wherein said guide includes a log guide attached to the log, said log guide including a guide edge which maintains contact with the fence as the log is moved to the cutter.

3. The apparatus of claim 2 wherein said log guide includes a log guide centerline in alignment with the log centerline.

4. The apparatus of claim 1, further comprising:

a fence positioned adjacent the support; and wherein said guide includes a fence guide attached to said fence, said fence guide including a guide edge which maintains contact with the bottom of a guide channel formed in the log at a uniform distance from the log centerline as the log is moved to the cutter.

5. The apparatus of claim 1 wherein said guide includes two opposed alignment elements forming a portion of said mover, said alignment elements being positionable adjacent the opposed edges of the log and being movable by said controller to clamp the log in compression between the alignment elements and to align the log centerline with respect to said cutter.

6. The apparatus of claim 5 wherein said controller is further operable to control said mover to move the log toward the cutter while maintaining alignment of the log centerline with respect to the cutter.

7. An apparatus for processing a log to be incorporated into a log structure, said log having two substantially parallel surfaces and a log centerline defined in a plane normal to the substantially parallel surfaces, the apparatus comprising:

a support for supporting the log substantially horizontally on one of its substantially parallel surfaces;

a fence positioned adjacent the support;

a cutter for cutting the log;

a mover for moving the log substantially horizontally along the support to said cutter;

a controller for controlling operation of the mover and the cutter; and at least one guide, which is not a portion of the log itself, in contact with said fence for maintaining the log centerline substantially parallel to said fence at a fixed distance from the fence as the log is moved to the cutter.

8. The apparatus of claim 7 wherein said at least one guide comprises a log guide attached to the log, said log guide including a guide edge which maintains contact with the fence as the log is moved to the cutter.

9. The apparatus of claim 8 wherein said log guide includes a log guide centerline in alignment with the log centerline.

10. The apparatus of claim 7 wherein said at least one guide includes a plurality of log guides attached to the log, each of said plurality of log guides including a log guide centerline in alignment with the log centerline and a guide edge which maintains contact with the fence as the log is moved to the cutter.

11. The apparatus of claim 7 wherein said at least one guide includes a fence guide attached to said fence, said fence guide including a guide edge which maintains contact with the bottom of a guide channel formed in the log at a uniform distance from the log centerline as the log is moved to the cutter.

12. The apparatus of claim 11 wherein said guide edge includes a roller.

13. The apparatus of claim 7 wherein said controller is further operable to move the cutter to a desired cutting position.

14. The apparatus of claim 7 wherein said cutter includes a circular saw blade.

15. The apparatus of claim 7 wherein said cutter includes a universal mill.

16. The apparatus of claim 7 wherein said cutter in includes a drill bit.

17. The apparatus of claim 7, further comprising one or more computer aided design workstations in electrical communication with the controller.

18. An apparatus for processing a log to be incorporated into a log structure, said log having two substantially parallel surfaces and a log centerline defined in a plane normal to the substantially parallel surfaces, the apparatus comprising:

a support for supporting the log substantially horizontally on one of its substantially parallel surfaces;

a fence positioned adjacent the support;

a cutter for cutting the log;

a mover for moving the log substantially horizontally along the support to said cutter;

a controller for controlling operation of the mover and the cutter; and at least one log guide in contact with said fence for maintaining the log centerline substantially parallel to said fence at a fixed distance from the fence as the log is moved to the cutter, said at least one log guide including a log guide centerline in alignment with the log centerline and a guide edge which maintains contact with the fence as the log is moved to the cutter.

19. The apparatus of claim 18 wherein said controller is further operable to move the cutter to a desired cutting position.

20. The apparatus of claim 18 wherein said cutter includes a circular saw blade.

21. The apparatus of claim 18 wherein said cutter includes a universal mill.

22. The apparatus of claim 18 wherein said cutter in includes a drill bit.

23. The apparatus of claim 18, further comprising one or more computer aided design workstations in electrical communication with the controller.

24. A method for processing a log to be incorporated into a log structure, said log having two substantially parallel surfaces, two opposed edges maintaining a natural contour of a raw timber log, and a log centerline defined in a plane normal to the substantially parallel surfaces, the method comprising:

supporting the log substantially horizontally on a first one of its substantially parallel surfaces;

attaching a log guide to the log, said log guide having a guide edge;

positioning the guide edge of the guide in contact with a fence; and moving the log substantially horizontally to a cutter for processing of the log as the guide edge is held in contact with the fence.

25. The method of claim 24, further comprising:

marking the log centerline on a second one of the substantially parallel surfaces;

marking a log guide centerline on the log guide; and aligning the log guide centerline with the log centerline when the log guide is attached to the log.

26. The method of claim 24 wherein said step of processing of the log includes cutting the log with a universal mill.

27. The method of claim 24 wherein said step of processing of the log includes cutting the log with a circular saw blade.

28. The method of claim 24 wherein said step of processing of the log includes cutting the log with a drill bit.

29. The method of claim 24 further comprising removing the log guide from the log after the log is processed.

* * * * *